March 21, 1939. R. J. PENNY ET AL 2,151,144
PEDAL OF FOOT-PROPELLED BICYCLES
Filed Jan. 2, 1937
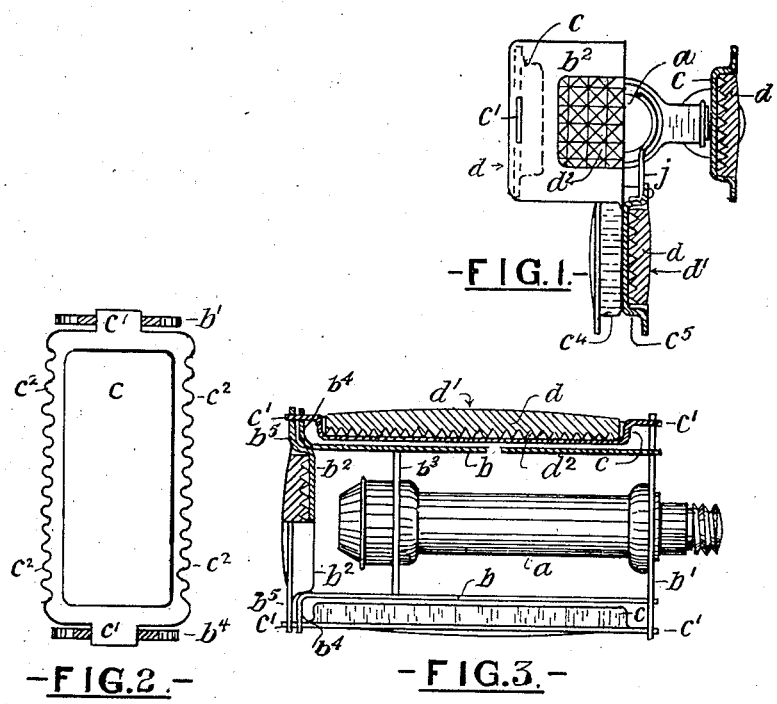
INVENTORS
Robert John Penny
Horace James Worthington Patented Mar. 21, 1939

2,151,144

UNITED STATES PATENT OFFICE 2,151,144

PEDAL OF FOOT-PROPELLED BICYCLES

Robert John Penny, Seacliff, South Australia, and Horace James Worthington, Beulah Park, South Australia, Australia Application January 2, 1937, Serial No. 118,714

1 Claim. (Cl. 88—81)

Our invention relates to improvements in and connected with pedals for foot-propelled bicycles. Hitherto the provision of lighting for bicycles of the foot-propelled type has proved unsatisfactory and numerous accidents have been rightly attributed to the inefficiency of illuminating devices.

The object of this invention is to overcome the danger arising from bad lighting, by providing the pedals with a constantly oscillating illuminating device which traverses a circular path upon a pedal crank and is of such a nature that it will become a conspicuous object when a bicycle is being propelled at night; such device being easily discernible by motorists and others carrying lights when a bicycle having pedals fitted with our device is approached from the front, or when being overtaken from the rear or the side.

For the purpose of our invention we construct and fit each pedal of the bicycle with a supporting frame hereinafter referred to as a container which is adapted to support a multi-facetted or prismatic translucent panel in such a manner that light rays from the lamps of an approaching vehicle will be received at varying angles and will be flashed back in ever changing rays at different angles.

In order that our invention may be more clearly understood we will now describe the same by aid of the accompanying illustrative drawing wherein:

Fig. 1 is an end view of our invention showing one-half of the pedal in section with a lower container added thereto.

Fig. 2 illustrates a container made of metal or other suitable composition of material adapted to receive a multi-facetted glass.

Fig. 3 is a plan of a pedal according to the invention in part section.

In each of the illustrations similar letters of reference are used to denote similar or corresponding parts wherever they occur, and the word "container" is used to denote a frame or attachment whereby a reflector is mounted upon or attached to a bicycle pedal.

In the drawing $a$ is a spindle of an ordinary pedal.

Two transverse frame bars are mounted rotatably on said spindle adjacent the ends thereof, the bar $b'$ at the inner end of the spindle having a length greater than that of the bar $b^3$ at the outer end of the spindle. Two longitudinal frame bars $b$ are disposed parallel to said spindle and secured to the inner transverse bar $b'$ at points short of the ends of the latter and to the extremities of the outer transverse bar $b^3$. The longitudinal bars $b$ project outwardly beyond the outer transverse bar $b^3$ and the spindle end and terminate in transversely and outwardly bent flanges $b^4$ to form casings with the projecting ends of the inner transverse bar $b'$. A container $c$ for a translucent reflecting panel is mounted in each of said casings by means of tongues $c'$ projecting through suitable apertures in the transverse bar $b'$ and the transverse flanges $b^4$. The container $c$ may be serrated along its edges as indicated at $c^2$ in Figure 2. A similar transverse container $b^2$ of smaller size than the longitudinal containers $c$ is mounted in between the portions of the longitudinal bars $b$ projecting beyond the spindle end. The container $b^2$ is provided with flanges $b^5$ overlapping the transverse flanges $b^4$ and being attached thereto by means of the tongues $c'$ projecting through apertures in the flanges $b^5$ registering with the above mentioned apertures in the flanges $b^4$.

Within each container, there is mounted a translucent reflector preferably of glass $d$ the outer edge of which may be formed with a convex surface $d'$ whilst the opposite or inner surface is characterized by a number of facets $d^2$ which are preferably of prismatic construction.

The contour of the outer surface may be varied according to requirements. The facets are in close proximity to the floor of the container if the container is constructed as a recessed panel as illustrated, or it may receive a lining of tinsel or the like (not illustrated in the drawing) or the floor of the container may receive a coating of suitable paint to reduce any effect of absorption of light by the surrounding metal or other material.

This construction affords ample support for the outer end of the spindle $a$ and also provides a relatively large transverse container for a multi-facetted glass member substantially similar to but shorter than the members indicated at $d$. As shown in Fig. 1, the device comprises a double frame $c^4$ and $c^5$ which is attached to the pedal spindle $a$ by a connecting element such as a metal clip or a suspender $j$ and the double frame which is supported thereby is fitted with two plates of facetted glass similar to and corresponding in direction with the facetted glasses on the front and rear pedal bars first described.

What we claim is:

A bicycle pedal, comprising a pedal spindle, two transverse frame bars mounted rotatably on said spindle adjacent the ends thereof, the bar at the inner end of the spindle having a length greater than that of the bar at the outer spindle end, two longitudinal frame bars parallel to said spindle and being secured to said inner transverse bar at points short of the ends of the latter and to the extremities of said outer transverse bar, said longitudinal bars projecting outwardly beyond said outer transverse bar and spindle end and terminating in transversely and outwardly bent flanges to form casings with the projecting ends of said inner transverse bar, a container for a translucent reflecting panel mounted in each of said casings, and a similar transverse container of smaller size mounted in between the portions of said longitudinal bars projecting beyond the spindle end and secured to said transverse end flanges.

ROBERT JOHN PENNY.
HORACE JAMES WORTHINGTON.